(12) United States Patent
Burrowes

(10) Patent No.: US 6,220,634 B1
(45) Date of Patent: Apr. 24, 2001

(54) BRANCHED HOSE CONSTRUCTION

(75) Inventor: Anh Tran Burrowes, Lincoln, NE (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/246,609

(22) Filed: Feb. 8, 1999

(51) Int. Cl.[7] .................................................. F16L 39/00
(52) U.S. Cl. ................................ 285/133.11; 285/133.5; 285/133.3
(58) Field of Search ........................... 285/133.11, 133.5, 285/133.3, 285.1, 331

(56) References Cited

U.S. PATENT DOCUMENTS

| | | |
|---|---|---|
| 3,378,282 | 4/1968 | Demler, Sr. . |
| 4,387,178 * | 6/1983 | Tracy et al. ........................... 524/448 |
| 4,613,168 | 9/1986 | Smith et al. . |
| 4,637,638 | 1/1987 | Rush et al. . |
| 4,648,628 | 3/1987 | Meadows et al. . |
| 4,654,942 | 4/1987 | Rush et al. . |
| 4,659,754 | 4/1987 | Edwards et al. . |
| 4,676,532 | 6/1987 | Gronau et al. . |
| 4,718,700 | 1/1988 | Horch et al. . |
| 4,871,004 | 10/1989 | Brown et al. . |
| 4,903,998 | 2/1990 | Stanley . |
| 4,996,262 | 2/1991 | Pyke et al. . |
| 4,996,263 | 2/1991 | Pyke et al. . |
| 5,268,134 | 12/1993 | Burlett et al. . |
| 5,299,839 * | 4/1994 | Mogavero ....................... 285/133.11 |
| 5,302,336 | 4/1994 | Hartel et al. . |
| 5,411,300 * | 5/1995 | Mitsui ............................. 285/133.11 |
| 5,762,850 * | 6/1998 | Pyle et al. ............................ 264/209 |

FOREIGN PATENT DOCUMENTS 0243216    3/1987   (EP) .

OTHER PUBLICATIONS

Abstract for DE 3534–620–A.
Abstract for J6 2132–638–A.

* cited by examiner

Primary Examiner—Lynne H. Browne
Assistant Examiner—Aaron Dunwoody
(74) Attorney, Agent, or Firm—Bruce J Hendricks

(57) ABSTRACT

A branched hose construction contains an insert having at least three legs and a plurality of hoses equal to the number of legs of the insert. Each hose has one end fitted over a leg of the insert. A molded saddle encapsulates the rigid insert and the junctions of its legs with the hoses. The improvement of the invention includes the particular rubber composition used for the molded saddle.

16 Claims, 1 Drawing Sheet

BRANCHED HOSE CONSTRUCTION

BACKGROUND OF THE INVENTION

This invention relates to an improved branched hose construction.

Hoses are used commonly in motor vehicles, washing machines and other equipment wherein media such as fluids must be conveyed from one part of the device to another. Hoses are commonly made of elastomeric material and may be reinforced. It is often necessary that these hoses cooperate with other hoses and transport or distribute the fluids from each. The distribution of fluids takes place where the different hoses meet. This juncture, which often is in the form of a "T," requires some sort of branched hose construction to enable transportation of the fluid without leakage. The fluids conveyed by the hoses are often at elevated temperatures and pressures. The working environment of the branched hose construction can also be hostile, with elevated temperatures, dirt and vibration. For these reasons, it is important that the branched hose construction maintain a degree of structural integrity to provide leakproof operation.

Recently, the appearance of the branched hose construction has become increasingly important, especially in the automotive industry for use with automotive cooling systems. Manufacturers of automobiles prefer that branched hose constructions have a clean, streamlined appearance in addition to being structurally sound and leakproof.

U.S. Pat. No. 4,648,628 to Dayco Products, Inc, discloses a branched hose construction. Clamping means are used to clamp the hoses against the respective legs of the T-connector. In addition, the legs of the T-connector are formed with annular shoulders so that the end of each hose abuts the shoulder and causes the external peripheral surface of the respective hoses to mate with and be flush with the external peripheral surface of the T-connector. In this way, an attractive appearance is obtained while the hoses are clamped against the legs of the T-connector. However, because the clamping means is located on the exterior of each hose, it remains visible and detracts from the appearance of the branched hose construction.

EPO Application 243 216 A discloses a flexible hose junction designed for use with automotive applications. A rigid "T" insert cooperates with three hoses in a manner similar to U.S. Pat. No. 4,648,628 previously discussed, except that no clamping means is utilized. Instead, hoses are held against the respective legs of the insert by an external overmolding made of a plastic material. After being molded to the branched hose construction, the overmolding material shrinks at least 1 percent and presses each hose against its respective branch of the insert. While this type branched hose construction presents an attractive, streamlined appearance, the lack of a clamping means often leads to problems with leakage and a lack of structural integrity.

U.S. Pat. No. 4,903,998 discloses a branched hose construction containing a rigid insert having at least three legs, a plurality of hoses, a securing means and a molded saddle. The saddle may be manufactured of an elastomeric material which is transfer-molded or a plastic material which can be injection-molded.

SUMMARY OF THE INVENTION

A branched hose construction according to the present invention has an insert having at least three legs. There are a plurality of hoses, the number of hoses being equal to the number of legs of the insert, with each hose having one end fitted over a leg of the insert. A molded saddle encapsulates the insert and the junctions of its legs with the hoses. The molded saddle is comprised of a unique rubber composition containing an EPDM alloy, an EPDM rubber and fibrillated aramid fibers.

DETAILED DESCRIPTION OF THE INVENTION

There is disclosed a branched hose construction comprising
 (A) an insert having at least three legs;
 (B) a plurality of hoses equal to the number of legs, each hose having one end fitted over a leg of the insert less than the total length of the leg;
 (C) a molded saddle encapsulating the insert and the junctions of its legs with the hoses wherein said molded saddle is a rubber composition comprising
  (1) an EPDM alloy comprised of
(a) a functionalized EPDM rubber,
(b) an EPDM rubber having nylon side chains grafted thereto and
(c) dispersed nylon;
  (2) an EPDM rubber; and
  (3) from 1 to 20 parts by weight per 100 parts by weight of rubber in said composition, of fibrillated aramid fibers.

By practicing the present invention, there is provided a new and improved branched hose construction with a lighter and yet stronger saddle having a higher compressive force. Advantages associated with the present invention include reduced weight and cost savings.

Figure 1:
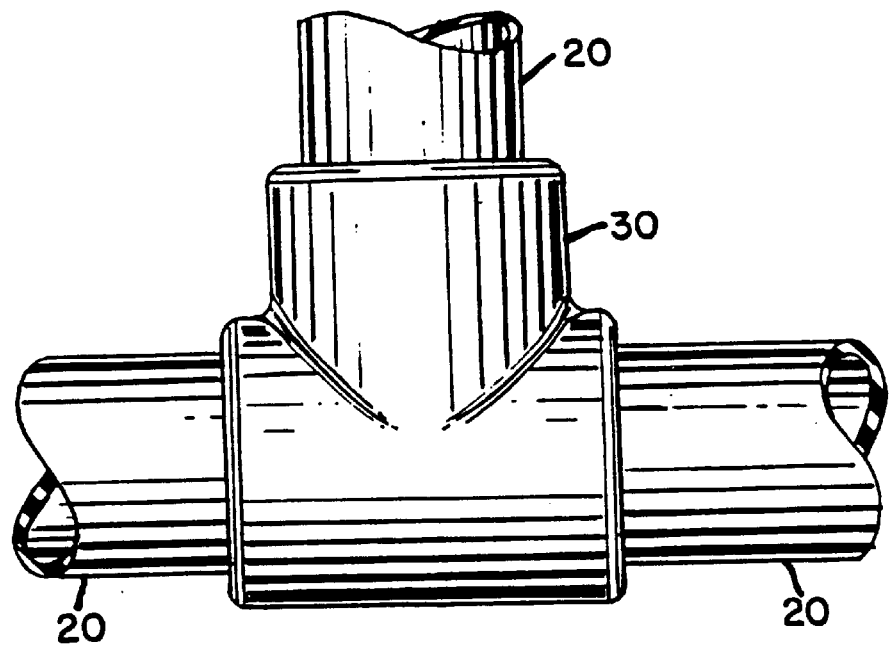
FIG. 1 is a view of the improved branched hose construction of this invention as it would appear to the end user.
Figure 2:
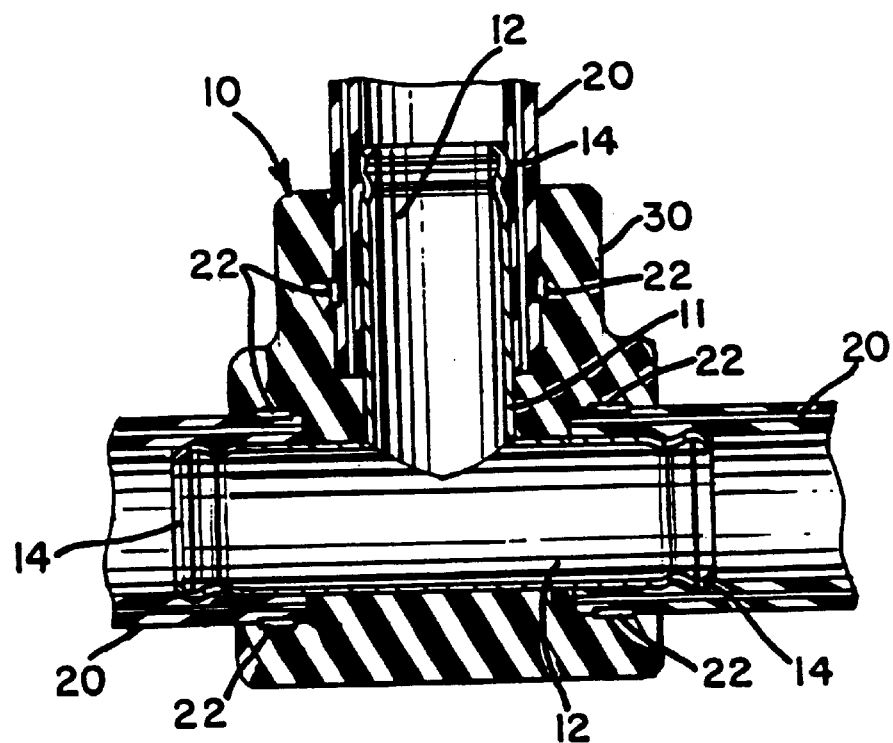
FIG. 2 is a cross-sectional view of FIG. 1, illustrating one embodiment of the improved branched hose construction of this invention.

With particular reference to FIG. 2, there is shown a branched hose construction 10 having an insert 11. The insert 11 preferably is made of any material that is substantially rigid and will not shrink as a result of vulcanization but is most commonly made of plastic or steel. An example of a preferred plastic insert is made of nylon. Where weight of the hose construction is not an issue, the preferred inserts are made of steel because steel inserts can withstand higher pressures and temperatures.

The insert 11 has at least three legs 12. Commonly, two of the legs have the same center line, with a third leg extending at 90° from the other two legs. A lip 14 may be located at the end of each leg. The lip provides a raised surface to prevent the hose 20 from slipping off the leg 12 once the hose has been fitted over a leg. In another embodiment, the insert may have two lips. The second lip may function to more accurately duplicate the degree of overlap of the hose 20 over the leg 12 of the insert. As a result of the combination of features of the present invention, no spring clamps or additional securing means is needed to hold the hose in alignment with the hose.

The hoses 20 are generally made of an elastomeric material. They can be reinforced with a variety of reinforcing materials such as fabric cords. In the application for which this invention was designed, the hose is reinforced with an aromatic polyamide known by The Goodyear Tire & Rubber Company tradename of "FLEXTEN™." One end of each hose is associated with each leg of the insert. The hose is fitted over the leg far enough to allow sufficient room for securing the hose to the leg. In the currently preferred embodiment, each leg is approximately 4.13 cm (1.625 inches) long and the hose is fitted over the leg for a distance of about 3.18 cm (1.25 inches), thus allowing the material of the molded saddle 30 to surround the annular end surface of each hose 20.

An adhesive means could be used to hold the hose in alignment with the insert prior to the application of the saddle; however, at this time, it is not preferred.

A saddle 30 is molded around the junction of the hoses and the insert 11. The rubber composition which is used as the molded saddle 30 is comprised of (a) an EPDM alloy comprised of (i) functionalized EPDM rubber, (ii) an EPDM rubber having nylon side chains grafted thereto and (iii) dispersed nylon, (b) an EPDM rubber and (c) fibrillated aramid fibers.

The relative amount of (a) EPDM alloy, (b) EPDM and (c) fibrillated aramid fibers may vary. Generally speaking, the relative amounts will range from 5 to 100 parts by weight of the EPDM alloy, from 20 to 96 parts by weight of the EPDM and 1 to 20 phr of the fibrillated aramid fibers (based on the total rubber in the composition). Preferably, the relative amounts range from 5 to 25 parts by weight of EPDM alloy, 80 to 96 parts by weight of EPDM and 1 to 5 phr of the fibrillated aramid fibers.

The total amount of nylon that is introduced to the rubber composition will be in the EPDM alloy. Therefore, the level of nylon and the amount of the EPDM alloy that is added to the overall rubber composition needs to be adjusted to reflect its total level of desired nylon in the overall rubber composition. The level of nylon in the overall composition will be within the range of from about 1 phr to about 20 phr (parts per hundred parts of rubber). This is the total amount of nylon in the EPDM rubber having nylon side chains grafted thereto and the dispersed nylon in the EPDM alloy. It is normally preferred for the amount of nylon in the composition to be within the range of about 1 phr to about 10 phr. It is more preferred for the amount of nylon in the rubber composition to be within the range of about 2 phr to about 5 phr.

The EPDM rubber having nylon side chains grafted thereto can be prepared utilizing the technique disclosed by U.S. Pat. No. 4,996,263 or U.S. Pat. No. 4,996,262, the teachings of which are incorporated herein by reference in their entirety. This technique involves reacting nylon with a functionalized rubber (maleated rubber) to produce rubber having nylon side-chains grafted thereto. As another example, the functionalized rubber can also be a carboxylated or sulfonated EPDM. Such procedures result in the formation of alloys (blends) which contain (i) functionalized EPDM rubber (which did not react), (ii) EPDM rubber having nylon side chains grafted thereto and (iii) dispersed nylon (which did not react).

In the preparation of such alloys, the nylon is normally molten during the period which it is mixed with the EPDM rubber. The morphology of the dispersed thermoplastic phase depends upon a variety of factors. Among these factors is the relative ratio of the viscosities of the two phases being mixed. Experience has shown that the domain size of the dispersed phase is smaller when the viscosities of the two phases are closely matched. One means of "matching" these viscosities after the thermoplastic material has melted is to reduce the viscosity of the elastomer phase by increasing the temperature of mixing to further soften the elastomer. However, this approach is not always viable and the temperature control needed to accomplish this objective is very sensitive.

The viscosities of the two phases can also be "matched" by adding an extending oil to the alloy during mixing to reduce the viscosity of the elastomer. This brings the viscosities of the two phases closer together and results in there being a better dispersion of the nylon. This oil extension approach eliminates or reduces the need to raise the mixing temperature to match the viscosities of the two phases. This saves the EPDM from undesirable degradation which can occur at higher temperatures. Another benefit realized by using this approach is that much higher concentrations of the nylon can be employed in the alloy without a detrimental effect on processing.

The oil extension process can be accomplished during alloy formation or the elastomer can be oil-extended prior to mixing. The only drawback to prior oil extension is that the soft nature of the elastomer will retard heat buildup during mixing and complicate processing. There may be limitations of this process from the nature of the extending oil and the two polymer phases. For example, the extending oil should extend the elastomer and not alter the nylon. Also, the extending oil should be easily taken up by the base elastomer and should not be volatile relative to the alloying temperature.

Virtually any type of nylon can be utilized in preparing the rubber compositions. These nylons are polyamides which can be prepared by reacting diamines with dicarboxylic acids. The diamines and dicarboxylic acids which are utilized in preparing such nylons will generally contain from about 3 to about 12 carbon atoms. Nylons can also be prepared by addition polymerization. Nylon which is prepared by reacting hexamethylene diamine with adipic acid (hexanedioic acid) can be utilized in the process of this invention. It is generally referred to as nylon-6,6 because it is derived from a diamine which contains 6 carbon atoms and a dicarboxylic acid which contains 6 carbon atoms. Nylon-6,6 typically has a number average molecular weight of 12,000 to 20,000, is exceptionally strong, abrasion resistant, and available from a wide variety of sources.

Polycapryllactam, which is generally referred to as nylon-8, is generally prepared by polymerization capryllactam. This polymerization takes place readily in the melt with a small amount of amino acid initiator. Capryllactam is prepared by dimerization of butadiene to cyclooctadiene, which is hydrogenated to cyclooctane, oxidized to cyclooctanone, converted to the oxime with hydroxylamine, and subjected to the Beckmann rearrangement. Nylon-8 has a melting point of 200° C.

Poly (ω-aminoundecanoic acid), known as nylon-11, can be prepared by the melt polymerization of ω-aminoundecanoic acid under an inert gas atmosphere at a temperature of about 215° C. Nylon-11 has a melting point of 190° C.

Nylon-12 or poly(ω-dodecanolactam) is normally prepared by the polymerization of ω-dodecanolactam at a high temperature of at least about 300° C. utilizing an acid catalyst. ω-dodecanolactam is prepared by trimerization of butadiene to cyclododecatriene, the subsequent hydrogenation to cyclododecane, followed by oxidation to cyclododecanone, which is converted to the oxime with hydroxylamine, with the oxime being rearranged by Beckmann rearrangement to yield the ω-dodecanolactam. Nylon-12 has a melting point of 179° C.

Nylon-6 or poly(ε-caprolactam) is normally prepared by the polymerization of ε-caprolactam at 250–270° C. in the presence of water and an initiator such as nylon-6,6 salt or aminocaproic acid. Polymerization to approximately 90 percent completion can be obtained. Monomer and higher oligomers can be extracted with hot water and the polymer then dried. ε-caprolactam is usually prepared by conversion of cyclohexanone to the oxime with hydroxylamine, the oxime being rearranged by Beckmann rearrangement to yield ε-caprolactam. Nylon-6 has a melting point of 223° C.

The nylons used in the process of this invention will typically have a number average molecular weight which is within the range of about 8,000 to about 40,000. Such nylons will more typically have number average molecular weights which are within the range of about 10,000 to about 25,000. The nylon utilized can be capped or can have free primary amine end groups. However, nylons having free amine end groups are believed to react more quickly with maleic anhydride and are accordingly preferred.

The nylons which are preferred for utilization in the process of this invention have melting points which are within the range of about 150° C. to about 295° C. Some representative examples of such preferred nylons include nylon-4, nylon-6, nylon-7, nylon-8, nylon-9, nylon-10, nylon-11, nylon-12, nylon-4,6, nylon-6,6, nylon-6,8, nylon-6,9, nylon-6,10, nylon-6,12, and copolymers thereof.

The aramid fibers used in the practice of this invention are composed of a trunk portion having a length in the range of about 0.2 to about 5 mm, a plurality of fibrils extending outwardly from the trunk along the entire length thereof and having diameters substantially smaller than the diameter of the trunk from which they extend. The fibers are in the form of a dry pulp prior to compounding. The surface area of the fibers is from about 4 to about 20 square meters per gram. Most of the surface area is attributable to the fibrils; the surface area of fibers used in the practice of this invention is about 30 to 60 times that of rod-like fibers having the same diameter distribution as that of the fibers used in this invention but with no fibrils.

Short, discontinuous fibrillated aramid fibers having the required characteristics for use in this invention are commercially available from E I du Pont de Nemours & Co, Wilmington, Delaware, as a pulp under name "Kevlar" 29. This material is in the form of extremely short fibrillated fibers having an average length of about 1 mm. These fibers have a surface area of 8 to 10 square meters per gram, which is 40 to 50 times that of rods having a diameter of 12 micrometers. Fibrillation (ie, the presence of fibrils) is responsible for this increase in surface area.

The aramid material is typically characterized as a long chain synthetic aramid polyamide in which at least 85 percent of the amide linkages are attached directly to two aromatic rings. Aramid is primarily poly (paraphenyleneterephthalamide).

Aramid in any of its various physical forms is essentially inextensible. This is shown by high tensile modulus and low elongation at break. Modulus and elongation data are given in U.S. Pat. No. 4,155,394 cited supra and in a product bulletin entitled "KEVLAR aramid," published by E I duPont de Nemours & Co, Inc. While values vary depending on grade (eg, "Kevlar," "Kevlar" 29 or "Kevlar" 49), physical form (eg, yarn, chopped fiber, etc) and presence or absence of impregnant, commercial aramid generally has a tensile modulus of at least about 6,000,000 pounds per square inch (about 40,000 megapascals) and an elongation at break not greater than about 5 percent.

The loading of aramid pulp in the rubber composition used in the saddle is in the range of about 1 to about 20 phr with a preferred range of from about 1 to about 10 phr. Little reinforcing effect is observed at loadings below 1 phr. More effective reinforcement is observed when the pulp loading is at least 2 phr, more especially at least 3 phr.

Dupont commercially offers Kevlar® pulp that is dispersed in rubbers which include those marketed under the designations 6F722 (natural rubber), 6F724 (SBR), 6F770 (NBR), 6F723 (polychloroprene Neoprene® CW), 6F736 (polychloroprene Neoprene® GRT) and 6F819 (polychloroprene Neoprene® WRT). The preferred polymer for use in the present invention is polychloroprene and the preferred designation is 6F819 containing Neoprene® WRT. Each of the above designations contain 77 percent by weight polymer and 23 percent by weight of Kevlar® pulp.

The rubber compositions for the saddle also contain conventional compounding ingredients such as sulfur, accelerator(s), activators, antidegradant(s), zinc oxide and stearic acid. The compositions may also contain conventional reinforcing fillers such as, for example, carbon black, silica or clay. Other ingredients, such as peptizers, color pigments and the like, may also be included.

Conventional fillers or reinforcing agents may be used in conventional amounts. For example, carbon black present in quantities from about 125 to about 200 phr. The rubber composition will normally contain at least 140 phr of carbon black to provide the level of stiffness desired. On the other hand, the utilization of more than 200 phr of carbon black leads to difficulties in processing. Carbon black, which is in particulate form, is generally the preferred reinforcing material. Other particulate reinforcing agents, such as silica (preferred) or clay, can be used when a non-black (ie, white or colored) elastomer is desired. A preferred silica is hydrated amorphous silica. Mixtures of reinforcing agents (eg, carbon black and silica) are also useful. The total amount of reinforcing agent(s) is sufficient for effective reinforcement, preferably from about 150 to about 175 phr (parts of reinforcing agent per 100 parts of rubber).

It may also be preferred to premix the entire quantity of aramid pulp with at least part of the reinforcing agent or mixture thereof (eg, carbon black), in order to handle the aramid pulp more easily and to facilitate its dispersion in rubber (or other elastomer). The reinforcing agent or mixture thereof acts as a partitioning agent. Aramid pulp fibers, because of their fluffy nature, disperse with difficulty if not so premixed. Either all or part of the carbon black may be premixed.

The rubber containing the EPDM alloy may be compounded with the aramid fibers (preferably premixed with carbon black) and other compounding ingredients according to conventional methods using conventional processing equipment. Mixing equipment may include one or more Banbury mixers. Usually more than one mixing stage is desirable.

For the EPDM component, one or a blend of two or more EPDMs may be used.

A number of conventional rubber additives may be used in the rubber composition for use in the molded saddle. It is important to include a processing oil (an extending oil) in the rubber composition at a level which is within the range of about 50 phr to about 125 phr. It is preferred for the processing oil to be present in an amount ranging from about 75 phr to about 100 phr. Zinc oxide may be included in the rubber composition at a level within the range of about 1 phr to about 15 phr. It is normally preferred for zinc oxide to be present in the rubber composition in an amount which is within the range of about 5 phr to about 10 phr. Benzoic acid may be included as a process aid and is generally used in an amount ranging from 0.1 to 2.0 phr. Polyethylene powder may be included as a process aid and is generally used in an amount ranging from 2.5 phr to 7.5 phr. Polyethylene glycol may be included as a process aid and is generally used in an amount ranging from 2 phr to 6 phr. Stearic acid may be included in the rubber composition in an amount which is within the range of about 0.1 phr to about 2 phr. It is preferred for the stearic acid to be present in the rubber composition in an amount which is within the range of about 0.1 phr to about 1 phr.

The productive rubber composition is prepared by adding a curative, such as sulfur and an accelerator to the nonproductive rubber composition. Sulfur or a sulfur containing compound is typically added in an amount which is within the range of about 0.2 phr to 6 phr. It is normally preferred for sulfur to be present in the productive rubber composition in an amount which is within the range of about 0.3 phr to 4 phr. It is most preferred for sulfur to be present in the rubber composition in an amount which is within the range of 0.5 phr to 2 phr.

One or more accelerators will also be included with sulfur curatives in the productive rubber composition. Some representative examples of accelerators which can be used include: mercapto benzothiazyl disulfide, 2-mercaptobenzothiazole, N-oxydiethylene benzothiazole-2-sulfenamide, N-cyclohexyl-2-benzothiazolesulfenamide, bismuth dimethyldithiocarbamate, cadmium diethyldithiocarbamate, copper dimethyldithiocarbamate, copper thiazole salt, lead dimethyldithiocarbamate, selenium diethyldithiocarbamate, selenium dimethyldithiocarbamate, tellurium diethyldithiocarbamate, zinc dimethyldithiocarbamate, zinc dibutyldithiocarbamate, tetramethylthiuram disulfide, tetraethylthiuram disulfide, dipentamethylene thiuram hexasulfide, tetramethylthiuram monosulfide and dimethylethyl thiourea. The productive rubber composition containing sulfur curatives will typically contain from about 1 phr to about 12 phr of accelerator. It is normally preferred for the accelerators to be present in an amount which is within the range of about 2.5 phr to about 10 phr. It is most preferred for the accelerator to be utilized at a level which is within the range of about 4 phr to about 8 phr.

Productive rubber compositions can also be cured with peroxide curatives. Such peroxide curatives will normally contain at least one peroxide compound, a crosslinking agent, and zinc oxide. It should be noted that zinc oxide is also used in standard sulfur curative systems. A wide variety of peroxide compounds can be used in such peroxide curative systems. However, acidic materials, such as peroxides based on acids or esters, should be avoided. Some representative examples of peroxide compounds which can be used include: methylethyl ketone peroxide, cyclohexanone peroxide, cumene hydroperoxide, pinane hydroperoxide, p-menthane hydroperoxide, t-butyl hydroperoxide, dicumyl peroxide, 2,5-dimethylhexane-2,5-dihydroperoxide, di-t-butyl peroxide, and the like. Dicumyl peroxide and di-t-butyl peroxide are highly preferred peroxide compounds. Some representative examples of crosslinking agents which can be used include: pentaerythritol tetraacrylate, trimethylol trimethacrylate, diallyl phthalate.

When injection molding is used, the branched hose construction is molded directly into the desired shape. The injection molding is normally conducted at a temperature which is within the range of 130° C. to 210° C. which is sufficient to cure the rubber composition in the desired geometric shape. It is preferred to utilize a temperature within the range of 140° C. to 200° C. with temperatures within the range of 170° C. to 195° C. being most preferred.

This invention is illustrated by the following examples which are merely for the purpose of illustration and are not to be regarded as limiting the scope of the invention or the manner in which it can be practiced. Unless specifically indicated otherwise all parts and percentages are given by weight.

EXAMPLE 1

A series of rubber compounds were prepared and tested for their properties and in particular for suitability in the branched hose construction of the present invention. The recipes for each of the five samples may be found in Table I. The physical properties for each sample may be found in Table II.

The rubber samples were prepared by mixing to a nonproductive rubber temperature of 174° C. maximum whereupon the mixture is discharged. Seventy-five percent by weight of the nonproductive is loaded in the mixer along with the curatives, followed by the remaining nonproductive compound. The productive mixing was conducted until a productive rubber temperature of 101–110° C. maximum is reached.

Each rubber sample was formed into rubber specimens and cured at 177° C. for 5 minutes.

TABLE I

|  | Sample 1 | Sample 2 | Sample 3 | Sample 4 | Control Sample 5 |
|---|---|---|---|---|---|
| EPDM Alloy[1] | 40 | 20 | 20 | 40 | 40 |
| EPDM[2] | 10 | 10 | 10 | 10 | 10 |
| EPDM[3] | 66.7 | 85.10 | 85.1 | 66.7 | 66.7 |
| Aramid Fibers[4] | 4.33 | 13 | 4.33 | 13 | 0 |
| Carbon Blacks | 150 | 150 | 150 | 150 | 150 |
| Paraffinic Oil | 84.3 | 81.9 | 81.9 | 84.3 | 84.3 |
| Silica | 25 | 25 | 25 | 25 | 25 |
| Silica Coupler[5] | 2.5 | 2.5 | 2.5 | 2.5 | 2.5 |
| Process Aids | 10 | 10 | 10 | 10 | 10 |
| Stearic Acid | 0.5 | 0.5 | 0.5 | 0.5 | 0.5 |
| Zinc Oxide | 5 | 5 | 5 | 5 | 5 |
| Accelerator[6] | 3 | 3 | 3 | 3 | 3 |
| Accelerator[7] | 1.28 | 1.28 | 1.28 | 1.28 | 1.28 |
| Accelerator[8] | 1.50 | 1.50 | 1.50 | 1.50 | 1.50 |
| Accelerator[9] | 1.00 | 1.00 | 1.00 | 1.00 | 1.00 |
| Sulfur | 1.55 | 1.65 | 1.55 | 1.65 | 1.50 |

[1]EPDM alloy containing 25 phr of nylon 6 from Allied Signal Corp under the designation Capron ® 8209F, 75 phr of EPDM from Uniroyal Chemical under the designation Royalene ® 525 and 25 phr of a maleated EPDM from Uniroyal Chemical under the designation Royal Turf ® 465. Alloy prepared in accordance with the general mixing procedures described in U.S. Pat. No. 5,268,134.
[2]EPDM obtained from Exxon Chemical Company under the designation Vistalon ™ 7000.
[3]EPDM obtained from Exxon Chemical Company under the designation Vistalon ™ 8510. This EPDM is oil-extended and contains 87 percent by weight EPDM and 13 percent oil.
[4]Neoprene WRT/Kevlar ™ masterbatch obtained from DuPont Elastomers under the designation 6F819. Twenty-three percent by weight of Kevlar pulp.
[5]50/50 by weight silane/carbon black mixture obtained from DeGussa under the designation X-50-S.
[6]Mercaptobenzothiazole disulfide
[7]Tetramethylthiuram disulfide
[8]Zinc dibutyldithiocarbamate
[9]Copper thiazole salt

TABLE II

|  | 1 | 2 | 3 | 4 | Control 5 |
|---|---|---|---|---|---|
| Original Properties from lab sheets cured at 5 min/177° C. (350° F.) | | | | | |
| Hardness (Shore A) | 82 | 81 | 81 | 83 | 80 |
| Tensile Strength (MPa) | 7.90 | 6.93 | 7.79 | 7.46 | 7.16 |
| Elongation (%) | 130 | 129 | 135 | 122 | 116 |
| 100% Modulus (MPa) | 6.23 | 5.57 | 5.87 | 6.37 | 6.37 |
| 5% Modulus (MPa) | 0.71 | 0.66 | 0.59 | 0.68 | 0.63 |
| 10% Modulus (MPa) | 1.12 | 1.04 | 0.97 | 1.11 | 1.04 |
| 20% Modulus (MPa) | 1.68 | 1.56 | 1.48 | 1.70 | 1.63 |
| 50% Modulus (MPa) | 3.25 | 2.90 | 2.92 | 3.30 | 3.21 |
| Oven Age; 70 Hr @ 100C (212F) | | | | | |
| Hardness (Shore A) | 86 | 87 | 86 | 86 | 84 |
| Tensile Strength (MPa) | 6.29 | 6.99 | 6.35 | 7.21 | 6.46 |
| Elongation (%) | 75 | 89 | 79 | 81 | 77 |
| 5% Modulus (MPa) | 0.90 | 0.83 | 0.81 | 0.98 | 0.81 |
| 10% Modulus (MPa) | 1.48 | 1.38 | 1.35 | 1.57 | 1.35 |
| 20% Modulus (MPa) | 2.28 | 2.14 | 2.08 | 2.36 | 2.08 |
| 50% Modulus (MPa) | 4.31 | 4.12 | 4.10 | 4.57 | 4.35 |
| Change in Hardness (Shore A) | 4 | 6 | 5 | 3 | 4 |
| Change in Tensile (% change) | −20.42 | 0.90 | −18.50 | −3.24 | −9.83 |
| Change in Elongation (% change) | −42.31 | −31.01 | −41.48 | −33.61 | −33.62 |
| Change in 5% Mod (% change) | 26.21 | 26.32 | 36.05 | 44.90 | 27.17 |
| Change in 10% Mod (% change) | 31.29 | 32.45 | 40.00 | 41.61 | 29.80 |
| Change in 20% Mod (% change) | 35.25 | 37.61 | 40.47 | 39.02 | 27.97 |
| Change in 50% Mod (% change) | 32.91 | 42.38 | 40.33 | 38.41 | 35.41 |
| Garlock Flow 8 min/163° C. (325° F.) | 3.6 | 3.7 | 3.7 | 3.5 | 3 |
|  | 3.6 | 3.6 | 3.7 | 3.5 | 3 |
|  | 3.5 | 3.7 | 3.7 | 3.4 | 2.8 |
|  | 3.5 | 3.6 | 3.6 | 3.4 | 3 |
| Average Flow = | 3.55 | 3.65 | 3.68 | 3.45 | 2.95 |
| Compression Set 22 hr @ 70C (158F) 25% defl (%) | 23.6 | 20.8 | 22.4 | 22 | 24.4 |

As can be seen from the above data, the absence of aramid fibers (Sample 5 Control), resulted in a high compression set value (low is desired). The unique combination of aramid fibers and the EPDM alloy results in reducing the compression set values and the least amount of change in elongation values after oven aging. These properties indicate superior performance when used in a branched hose construction since such constructions are used in the high temperature environment of an engine compartment. The higher Garlock Flow values of Samples 1–4 versus Sample 5 suggest improved processing.

What is claimed is:

1. A branched hose construction comprising
(A) an insert having at least three legs;
(B) a plurality of hoses equal to the number of legs, each hose having one end fitted over a leg of the insert less than the total length of the leg;
(C) a molded saddle encapsulating the insert and the junctions of said legs with the hoses wherein said molded saddle is a rubber composition comprising
(1) an EPDM alloy comprised of
(a) a functionalized EPDM rubber,
(b) an EPDM rubber having nylon side chains grafted thereto and
(c) dispersed nylon;
(2) an EPDM rubber; and
(3) from 1 to 20 parts by weight per 100 parts by weight of rubber in said composition, of fibrillated aramid fibers.

2. The branched hose construction of claim 1 wherein said rubber composition comprises
(a) from 5 to 100 parts by weight of said EPDM alloy;
(b) from 20 to 96 parts by weight of said EPDM rubber; and
(c) from 1 to 20 phr of aramid fibers.

3. The branched hose construction of claim 2 wherein said rubber composition comprises
(a) from 5 to 25 parts by weight of EPDM alloy;
(b) from 80 to 96 parts by weight of EPDM; and
(c) from 1 to 5 phr of the fibrillated aramid fibers.

4. The branched hose construction of claim 1 wherein the amount of nylon in said rubber composition ranges from about 1 phr to 20 phr.

5. The branched hose construction of claim 1 wherein the insert is made of steel.

6. The branched hose construction of claim 1 wherein the insert is made of nylon.

7. The branched hose construction of claim 1 wherein said composition contains from 125 to 200 phr of carbon black.

8. The branched hose construction of claim 1 wherein said nylon is selected from the group consisting of nylon-4, nylon-6, nylon-7, nylon-8, nylon-9, nylon-10, nylon-11, nylon-12, nylon-4,6, nylon-6,6, nylon-6,8, nylon-6,9, nylon-6,10 and nylon-6,12.

9. The branched hose construction of claim 1 wherein said aramid fibers are dispersed in rubber prior to its addition to the rubber composition.

10. The branched hose construction of claim 9 wherein said rubber is selected from the group consisting of NBR, SBR, natural rubber and polychloroprene.

11. The branched hose construction of claim 10 wherein said rubber is polychloroprene.

12. The branched hose construction of claim 1 wherein from 1 to 12 phr of accelerator is present.

13. The branched hose construction of claim 12 wherein said accelerator is selected from the group consisting of merceptobenzothiazole disulfide, copper thiazole salt, zinc dibutyldithiocarbamate, tetramethylthiuram disulfide and mixtures thereof.

14. The branched hose construction of claim 1 wherein said composition is sulfur-vulcanized.

15. The branched hose construction of claim 1 wherein said composition is cured with peroxide curatives.

16. The branched hose construction of claim 1 wherein from 50 phr to 125 phr of a processing oil is present.

* * * * *